United States Patent
Nielsen et al.

(10) Patent No.: US 10,690,113 B2
(45) Date of Patent: Jun. 23, 2020

(54) WIND TURBINE BLADES AND RELATED METHODS OF MANUFACTURING

(71) Applicant: LM WP PATENT HOLDING A/S, Kolding (DK)

(72) Inventors: Lars Nielsen, Skanderborg (DK); Klavs Jespersen, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 47 days.

(21) Appl. No.: 16/064,782

(22) PCT Filed: Dec. 19, 2016

(86) PCT No.: PCT/EP2016/081746
§ 371 (c)(1),
(2) Date: Jun. 21, 2018

(87) PCT Pub. No.: WO2017/108692
PCT Pub. Date: Jun. 29, 2017

(65) Prior Publication Data
US 2019/0010919 A1    Jan. 10, 2019

(30) Foreign Application Priority Data
Dec. 23, 2015 (EP) .................................... 15202377

(51) Int. Cl.
*F03D 1/06* (2006.01)
*B29C 65/00* (2006.01)
(Continued)

(52) U.S. Cl.
CPC ........ *F03D 1/0675* (2013.01); *B29C 66/7212* (2013.01); *B29D 99/0025* (2013.01);
(Continued)

(58) Field of Classification Search
CPC .............. F03D 1/0675; B29C 66/7212; B29D 99/0025; Y02E 10/721; F05B 2280/6003;
(Continued)

(56) References Cited

U.S. PATENT DOCUMENTS 7,438,533 B2 * 10/2008 Eyb ........................ F03D 1/0658
416/230
7,942,637 B2 * 5/2011 Akhtar .................. F03D 1/0675
416/226

(Continued)

FOREIGN PATENT DOCUMENTS

EP    1485610 A1    12/2004
EP    2033769 A1    3/2009
(Continued)

OTHER PUBLICATIONS

Extended European Search Report dated Jun. 8, 2016 in corresponding European Patent Application No. EP 15202377.6.

*Primary Examiner* — Richard A Edgar
(74) *Attorney, Agent, or Firm* — Nath, Goldberg & Meyer; Jerald L. Meyer; Tanya E. Harkins (57) ABSTRACT

The present disclosure relates to a wind turbine blade. The wind turbine blade comprises a load carrying structure made of a fibre-reinforced polymer material. The load carrying structure comprises a plurality of stacked fibre layers or fibre mats in a thickness of the load carrying structure. The plurality of said stacked fibre layers or fibre mats are made of hybrid material comprising both carbon fibres and glass fibres and having a carbon fibre ratio. The carbon fibre ratio is defined as a volume of the carbon fibres divided by a total volume of the glass fibres and carbon fibres. At least a number of said stacked fibre layers or fibre mats have different carbon fibre ratios such that the carbon fibre ratio of fibre material varies through the thickness of the load carrying structure.

15 Claims, 7 Drawing Sheets

(51) Int. Cl.
*B29D 99/00* (2010.01)
*B29L 31/08* (2006.01)

(52) U.S. Cl.
CPC . *B29L 2031/085* (2013.01); *F05B 2280/6003* (2013.01); *F05B 2280/6013* (2013.01); *Y02E 10/721* (2013.01); *Y02P 70/523* (2015.11)

(58) Field of Classification Search
CPC ........ F05B 2280/6013; B29L 2031/085; Y02P 70/523
See application file for complete search history.

(56) References Cited

U.S. PATENT DOCUMENTS

| 7,988,423 B2 * | 8/2011 | Hancock | F03D 1/0675 416/226 |
| 2005/0186081 A1 | 8/2005 | Mohamed | |

FOREIGN PATENT DOCUMENTS

| EP | 2318703 A2 | 5/2011 |
| WO | 2013010979 A2 | 1/2013 |

* cited by examiner

WIND TURBINE BLADES AND RELATED METHODS OF MANUFACTURING

This is a National Phase Application filed under 35 U.S.C. 371 as a national stage of PCT/EP2016/081746, filed Dec. 19, 2016, an application claiming the benefit of European Application No. 15202377.6, filed Dec. 23, 2015, the content of each of which is hereby incorporated by reference in its entirety.

FIELD OF THE INVENTION

The present disclosure pertains to the field of wind turbine blades, and more specifically to composite structures thereof. The present disclosure relates to wind turbine blades, and methods of manufacturing at least a part of a wind turbine blade.

BACKGROUND OF THE INVENTION

A wind turbine blade comprises a load carrying structure which provides stiffness and rigidity to the construction of the blade. The load carrying structure is typically manufactured in a fibre reinforcing material. The fibre reinforcing material is often stacked forming a plurality of stacked fibre layers, while aligning an orientation of the fibres with the longitudinal direction of the load carrying structure in order to provide stiffness in the longitudinal direction. Today, the fibre layers are mostly selected from glass fibres or carbon fibres or hybrid material, and the design is chosen as a compromise considering both direct costs and performance in terms of overall weight and mass moment. A fibre layer made of a hybrid material comprises both carbon fibres and glass fibres. Glass fibres provide a different stiffness than carbon fibres. So a fibre layer made of a hybrid material with a static carbon fibre ratio gains in stiffness. However, the wind turbine blade may benefit from various degrees of stiffness and from various degrees of compression at various positions of the wind turbine blade, such as a root region, or a tip. A high carbon fibre ratio is advantageous towards the tip of the wind turbine blade to minimize deflection and reduce mass moment, while a high glass main laminate is advantageous in the root which experiences large compression straining.

There is a need for a method of manufacturing a wind turbine blade where the layup process may be simplified and for a blade where the variation in carbon fibre and glass fibre contents may be controlled and optimised to a higher degree.

SUMMARY OF THE INVENTION

It is an object of the present disclosure to provide a wind turbine blade and a method of manufacturing a part of a wind turbine blade which overcome or ameliorate at least one of the disadvantages of the prior art or which provide a useful alternative.

The present disclosure relates to a wind turbine blade. The wind turbine blade comprises a load carrying structure made of a fibre-reinforced polymer material. The load carrying structure comprises a plurality of stacked fibre layers, such as fibre mats, in a thickness of the load carrying structure. The plurality of said stacked fibre layers or fibre mats are made of hybrid material comprising both carbon fibres and glass fibres and having a carbon fibre ratio. The carbon fibre ratio is defined as a volume of the carbon fibres divided by a total volume of the glass fibres and carbon fibres. At least a number of said stacked fibre layers or fibre mats have different carbon fibre ratios such that the carbon fibre ratio of fibre material varies through the thickness of the load carrying structure.

Thus, the present disclosure provides a blade, where the appropriate stiffness in the root region of the wind turbine blade, the appropriate weight at the tip end, and a gradual stiffness transition to a higher degree may be achieved between the different regions of the load carrying structure. The present disclosure also provides an additional control dimension to optimize the design and manufacturing of the wind turbine blade, namely by allowing to customize the carbon fibre ratio of the fibre layers or fibre mats forming the load carrying structure so as to optimize the tip stiffness/ weight.

While it has been described that the stacked fibre layers or fibre mats vary in the thickness of the load-carrying structure, it is understood that this may be the case for only a longitudinal part of the load-carrying structure. The central longitudinal part may for instance have a varying carbon fibre ratio through the thickness, whereas the end parts (e.g. near tip or root may comprise hybrid material having only one carbon fibre ratio.

The present disclosure relates to a method of manufacturing at least a part of a wind turbine blade. The wind turbine blade comprises a load carrying structure. The method comprises providing a plurality of stacked fibre layers or fibre mats comprising both carbon fibres and glass fibres, having a carbon fibre. The method comprises arranging the plurality of said stacked fibre layers or fibre mats in a mould so as to obtain a varying carbon fibre ratio through the thickness of the load carrying structure. The method comprises infusing said plurality of stacked fibre layers or fibre mats with a resin. The method comprises curing said resin to form at least part of a wind turbine blade.

It is clear that the aforementioned aspects of the invention may be combined in any way and are linked by the common aspect of adapting the carbon fibre ratio through the thickness of the load carrying structure of the wind turbine blade.

It is noted that advantages enunciated with respect to the wind turbine blade apply to the method of manufacturing a part of the wind turbine blade.

BRIEF DESCRIPTION OF THE FIGURES

Embodiments of the invention will be described in more detail in the following with regard to the accompanying figures. The figures show one way of implementing the present invention and are not to be construed as being limiting to other possible embodiments falling within the scope of the attached claim set.

DETAILED DESCRIPTION OF THE INVENTION

Modern hybrid blades are often designed under consideration of a compromise between compression safety in the root by having an increased thickness to compensate for the reduced compression capacity and safety head room, whereas the tip on the other hand is compromised by not being stiff enough or having an unnecessary large compression safety head room. It is clear that the wind turbine blade is formed as an elongated structure having a longitudinal direction. Both the aerodynamic shell and the load carrying structure are therefore also formed as elongated structures connected to each other along a connection surface extending in the longitudinal direction of the blade. The aerodynamic shell may advantageously be formed as a thin or relatively thin shell. The first fibre-reinforcement material may substantially be composed of carbon fibres and glass fibres. Glass fibres are compatible with polyester based resins, thus providing a good mechanical bonding, whereas carbon fibres have a better bonding to an epoxy based resin. Further, the transition between sections of mostly the glass fibres and sections with higher carbon fibre ratio is crucial and needs to be as smooth as possible to avoid the risk of mechanical failure in stress due to stress concentrations.

In another design, a wind turbine blade comprises a load carrying structure made of fibre-reinforced polymer including a first type of fibres, such as glass fibres, of a first stiffness and a second type of fibres, such as carbon fibres, of a second stiffness that is different from the first stiffness. In a transition region between the two types of fibres the quantitative ratio of the two types of fibres varies continuously in the longitudinal direction of the blade. The load carrying structure may for instance comprise a plurality of fibre layers or fibre mats and layers or mats having the first types of fibres and layers or mats having the second types of fibres may have different carbon fibre ratio, achieving in a stacked manner an overall carbon fibre ratio at a given section of the load carrying structure. Additionally, the boundaries between layers or fibre mats having the first types of fibres and layers having the second types of fibres may be mutually shifted in the longitudinal direction of the blade so that a step tapered transition is achieved. It has been found that such a tapered transition is not mechanically strong. In order to compensate for stress concentrations when using fibres with varying carbon fibre ratio, it is possible to provide a local thickening in the transition area between the two different fibres and thereby limit the risk of failure due to stress concentrations. One drawback of such a solution is, however, increased weight due to the increased use of fibres, e.g. glass fibres, in the transition area between glass fibres and carbon fibres. Therefore, the varying carbon fibre ratio across the length of the blade achieved by layers or fibre mats having different carbon fibre ratio provides a smooth transition with a minimized risk of failure due to stress and also with a reduced overall weight.

The present disclosures addresses this by providing a wind turbine blade where the load carrying structure comprises fibre layers or fibre mats with a varying carbon fibre ratio stacked together to form the load carrying structure with a carbon fibre ratio varying along the length of the blade.

The present disclosure relates to a wind turbine blade. Accordingly, the invention preferably relates to a wind turbine blade as well as an intermediary elongated structure having a total length of at least 30 metres, 40 metres, 45 metres, or 50 metres and a thickness of 1-80 mm. The wind turbine blade comprises a load carrying structure, such as a spar, a spar cap, a main or principle laminate. The load carrying structure is made of fibre-reinforced polymer material.

The load carrying structure comprises a plurality of stacked fibre layers or stacked fibre mats in a thickness of the load carrying structure. The stacked fibre layers or fibre mats are for example stacked fabric mats or layers. The plurality of stacked fibre layers or fibre mats is made of hybrid material comprising both carbon fibres and glass fibres. The plurality of stacked fibre layers or fibre mats has a carbon fibre ratio, which is defined as a volume of the carbon fibres divided by a total volume of the glass fibres and carbon fibres. A fibre layer or fibre mat may substantially be composed of carbon fibres and/or glass fibres according to a given carbon fibre ratio.

The fibre layer or fibre mat made of hybrid material allows placing the layers or mats much faster during manufacturing and controlling the orientation of carbon fibres compared to carbon fibre mats, where it can be difficult to prevent wrinkling.

At least a number of the stacked fibre layers or fibre mats have different carbon fibre ratios such that the carbon fibre ratio of fibre material varies through the thickness of the load carrying structure.

The stacked fibre layers or fibre mats advantageously comprise a number of first fibre layers or first fibre mats having a first carbon fibre ratio and a number of second fibre layers or second fibre mats comprising a second carbon fibre ratio. In other words, the stacked fibre layers or fibre mats advantageously comprise at any cross section of the fibre mat a number of first fibre layers or first fibre mats having a first carbon fibre ratio and a number of second fibre layers or second fibre mats comprising a second carbon fibre ratio. Thus, the stacked fibre layers or fibre mats comprise at least two different types of hybrid material mats. In one embodiment, the first carbon fibre ratio and the second carbon fibre ratio differs with at least 10%, but it may also be at least 15% or 20%.

In one or more embodiments, at least a number of the stacked fibre layers or stacked fibre mats are made of glass fibre rovings arranged on a carbon fibre substrate. For example, at least one or more stacked fibre layers or fibre mats are made of glass fibre rovings arranged on a carbon fibre substrate. Providing a fibre layer or fibre mats having a combination of glass and carbon fibres that satisfies a specific carbon fibre ratio allows for ease of handling and lay-up for the manufacture of the wind turbine blade. Such an arrangement of glass fibre rovings on a carbon fibre substrate provides improved performance over the prior art, with testing showing that the above structure provides 140% compressive strength, when compared with the performance of traditional in-ply hybrid materials. The carbon fibre substrate is a planar layer of carbon fibres. In one aspect, the carbon fibre substrate is formed by at least one carbon fibre tow flattened or elongated into a relatively thin layer.

In one or more embodiments, at least a number of the stack fibre layers or fibre mats having different carbon fibre ratios is obtained by the fibre layers or fibre mats having different thicknesses of carbon fibre substrate. The carbon fibre ratio defines the thickness ratio of the carbon fibre substrate to the plurality of glass fibre rovings. In a preferred embodiment, the thickness ratio of the carbon fibre substrate to the plurality of glass fibre rovings is approximately 1:2-1:10. For example, the carbon fibre substrate may have a thickness of 0.1-0.7 mm, e.g. approximately 0.2 mm, and the glass fibre rovings layer may have a thickness or diameter of 0.4-1.0 mm, e.g. approximately 0.6 mm. The hybrid material layer itself has a thickness of between 0.6-1.5 mm, advantageously 0.8-1.2 mm.

Preferably, the plurality of glass fibre rovings are arranged as a series of parallel longitudinally extending rovings positioned on top of the carbon fibre substrate.

Preferably, the carbon fibre substrate comprises a layer of longitudinally extending carbon fibres.

In one or more aspects, the plurality of glass fibre rovings are provided on a first side of fibre layer or fibre mat, and the carbon fibre substrate is provided on a second side of the fibre layer or fibre mat, wherein at least one carbon fibre tow is positioned among the plurality of glass fibre rovings on top of the carbon fibre substrate.

In one or more embodiments, the load carrying structure comprises at least a first longitudinally extending section. An overall carbon fibre ratio of the load carrying structure varies gradually in the longitudinal direction of the blade. The overall carbon fibre ratio (or resulting carbon fibre ratio) is defined as the ratio between the total carbon fibre volume and the total fibre volume forming the thickness of the load carrying structure. The load carrying structure has a length along a longitudinal direction of the blade. The load-carrying structure preferably extends substantially in a longitudinal direction of the wind turbine blade in direction between a root end and a tip end of the blade. The plurality of stacked fibre layers or fibre mats may comprise fibres having an orientation aligned unidirectionally and advantageously substantially in the longitudinal direction. The longitudinal direction may be defined as the direction along the length of the wind turbine blade, such as from a root end of the wind turbine blade towards the tip end of the wind turbine blade, e.g. towards a tip end of a wind turbine blade.

In one or more embodiments, the overall carbon fibre ratio is gradually increasing along the first longitudinally extending section towards a tip end of the blade. Thereby, a gradual stiffness transition is achieved across the length of the load carrying structure. In addition, sides of the individual fibre layers or fibre mats may be tapered or chamfered.

According to some aspects of this disclosure, the load carrying structure is a spar cap, advantageously integrated in a blade shell of the wind turbine blade. Wind turbine blades are often manufactured according to one of two constructional designs, namely a design where a thin aerodynamic shell is glued onto a spar beam, or a design where load carrying structures as spar caps are integrated into the aerodynamic shell.

In a design, the load carrying structures (i.e. the spar caps or main laminates) are integrated into the shell and are moulded together with the aerodynamic shell. The load carrying structure typically comprises a high number of fibre layers or mats compared to the remainder of the blade and may form a local thickening of the wind turbine shell, at least with respect to the number of fibre layers or mats. Thus, the load carrying structure may form a fibre insertion in the blade. In this design, the load carrying structures constitute the load carrying structure. The blade shells are typically designed with a first load carrying structure integrated in the pressure side shell part and a second load carrying structure integrated in the suction side shell part. The first load carrying structure and the second load carrying structure are typically connected via one or more shear webs. For very long blades, the blade shells further along at least a part of the longitudinal extent comprise an additional first load carrying structure in the pressure side shell, and an additional second load carrying structure in the suction side shell. These additional load carrying structure may also be connected via one or more shear webs. This design has the advantage that it is easier to control the aerodynamic shape of the blade via the moulding of the blade shell part.

According to aspects of this disclosure, the carbon fibre ratio of the stacked fibre layers or fibre mats lies in an interval between 5% to 80%. According to an advantageous embodiment, the carbon fibre ratio across or averaged over the stacked fibre layers or fibre mats is at least 5%, or at least 10%, or at least 20%, or at least 25%, or at least 30%, or at least 35%, or at least 40%, or at least 50%, or at least 60%, or at least 70%, or at least 80% along at least a section of the load carrying structure.

In one or more embodiments, at least a number of the fibre layers or fibre mats have a carbon fibre ratio between 30% and 80%, such as between 35% and 65%. According to an advantageous embodiment, a fibre layer or fibre mat comprises at least 25%, or at least 30%, or at least 35%, or at least 40%, or at least 50%, or at least 60%, or at least 70%, or at least 80%, or at least 90% of carbon fibres. The fibre layer or fibre mat may even be fully constituted by carbon fibres.

In advantageous embodiment, an overall carbon fibre ratio through the length of the load carrying structure from the root to the tip of the wind turbine blade varies between about 0% to 20% at the root to about 50% to 70% at the tip.

In one or more embodiments, the hybrid material layer are during manufacturing provided as a dry fibre mat, which is impregnated with a liquid resin and hardened or cured in order to form a composite structure. In an advantageous embodiment, a fibre layer may be in form of a hybrid mat comprising both glass fibres and carbon fibres according to a carbon fibre ratio, which when stacked together with other fibre layers with different carbon fibre ratio achieves a target carbon fibre averaged over or across the thickness of the stacked fibre layers at a given section, i.e. averaged over the stacked fibre layer forming the thickness of load carrying structure at the given section.

According to some aspects, the thickness of the load carrying structure is tapered in the longitudinal direction towards a tip end of the blade by reducing the number of stacked fibre layers or fibre mats towards the tip end of the blade. In practice this may be carried out by the end faces of juxtaposed stacked layers or fibre mats being shifted relative to each other in the longitudinal direction.

In one or more embodiments, outermost layers of the stacked fibre layers or fibre mats have a higher carbon fibre ratio than innermost layers of the stacked fibre layers or fibre mats. This provides a simple way of increasing the overall carbon fibre ratio towards the tip end of the blade, e.g. by extending only the outermost layers towards the tip of the blade. Thereby a gradual transition is achieved through the thickness of the load carrying structure. The outermost layers of the stacked fibre layers correspond to fibre layers proximal to an exterior of the blade, while the innermost fibre layers correspond to fibre layers distal to the exterior of the blade. If using negative moulds, the outermost layers are stacked first and the innermost layers are stacked on top of the outermost layers.

It is of course also possible to let the outermost layers have a lower carbon fibre ratio, e.g. if the carbon fibre contents should be lowered towards the tip of the blade. Such a design may have advantages in terms of lightning protection purposes.

This disclosure further relates to a method of manufacturing at least a part of a wind turbine blade comprising a load carrying structure. The method comprises providing a plurality of stacked fibre layers or fibre mats comprising both carbon fibres and glass fibres. For example, the method comprises stacking a plurality of stacked fibre layers or fibre mats by stacking a plurality of fibre layers or arranging a plurality of fibre layer so that the fibre layers at least partially overlap, so as to form the thickness of the load carrying structure.

The method comprises arranging the plurality of the stacked fibre layers or fibre mats in a mould so as to obtain a varying carbon fibre ratio through the thickness of the load carrying structure. The carbon fibre ratio is configured to vary through the thickness so as to achieve an optimal stiffness. In one or more embodiments, arranging the plurality of the stacked fibre layers or fibre mats in a mould comprises arranging the plurality of individual hybrid material layers. The arranging step can be performed by positioning a plurality of hybrid material layers such that a plurality of the fibre layers or fibre mats at least partially overlaps in a stack.

The method comprises infusing the plurality of stacked fibre layers or fibre mats with a resin; and curing the resin to form at least part of a wind turbine blade.

Infusing the plurality of stacked fibre layers or fibre mats with a resin may be performed using vacuum infusion or VARTM (vacuum assisted resin transfer moulding) which is typically employed for manufacturing composite structures, such as wind turbine blades comprising a fibre reinforced matrix material. During the process of filling the mould, a vacuum, the vacuum in this connection being understood as an under-pressure or negative pressure, is generated via vacuum outlets in the mould cavity, whereby liquid polymer is drawn into the mould cavity via the inlet channels in order to fill the mould cavity. From the inlet channels the polymer disperses in all directions in the mould cavity due to the negative pressure as a flow front moves towards the vacuum channels. Thus, it is important to position the inlet channels and vacuum channels optimally in order to obtain a complete filling of the mould cavity. Ensuring a complete distribution of the polymer in the entire mould cavity is, however, often difficult, and accordingly this often results in so-called dry spots, i.e. areas with fibre material not being sufficiently impregnated with resin. Thus dry spots are areas where the fibre material is not impregnated, and where there can be air pockets, which are difficult or impossible to remove by controlling the vacuum pressure and a possible overpressure at the inlet side. In vacuum infusion techniques employing a rigid mould part and a resilient mould part in the form of a vacuum bag, the dry spots can be repaired after the process of filling the mould by puncturing the bag in the respective location and by drawing out air for example by means of a syringe needle. Liquid polymer can optionally be injected in the respective location, and this can for example be done by means of a syringe needle as well. This is a time-consuming and tiresome process. In the case of large mould parts, staff have to stand on the vacuum bag. This is not desirable, especially not when the polymer has not hardened, as it can result in deformations in the inserted fibre material and thus in a local weakening of the structure, which can cause for instance buckling effects.

In most cases the resin or polymer applied is polyester, vinyl ester or epoxy, but may also be PUR or pDCPD. Epoxies have advantages with respect to various properties, such as shrinkage during curing (in turn potentially leading to less wrinkles in the laminate), electrical properties and mechanical and fatigue strengths. Polyester and vinyl esters have the advantage that they provide better bonding properties to gelcoats. Thereby, a gelcoat may be applied to the outer surface of the shell during the manufacturing of the shell by applying a gelcoat to the mould before fibre-reinforcement material is arranged in the mould. Thus, various post-moulding operations, such as painting the blade, may be avoided. Further, polyesters and vinyl esters are cheaper than epoxies. Consequently, the manufacturing process may be simplified and costs may be lowered.

Often the composite structures comprise a core material covered with a fibre reinforced material, such as one or more fibre reinforced polymer layers. The core material can be used as a spacer between such layers to form a sandwich structure and is typically made of a rigid, lightweight material in order to reduce the weight of the composite structure. In order to ensure an efficient distribution of the liquid resin during the impregnation process, the core material may be provided with a resin distribution network, for instance by providing channels or grooves in the surface of the core material.

As for instance blades for wind turbines have become bigger and bigger in the course of time and may now be more than 60 meters long, the impregnation time in connection with manufacturing such blades have increased, as more fibre material has to be impregnated with polymer. Furthermore, the infusion process has become more complicated, as the impregnation of large shell members, such as blades, requires control of the flow fronts to avoid dry spots, the control may e.g. include a time-related control of inlet channels and vacuum channels. This increases the time required for drawing in or injecting polymer. As a result, the polymer has to stay liquid for a longer time, normally also resulting in an increase in the curing time.

Alternatively, infusing the plurality of stacked fibre layers with a resin can be performed using Resin transfer moulding (RTM) which is similar to VARTM. In RTM the liquid resin is not drawn into the mould cavity due to a vacuum generated in the mould cavity. Instead the liquid resin is forced into the mould cavity via an overpressure at the inlet side.

Further, infusing the plurality of stacked fibre layers with a resin can be performed using prepreg moulding technique which reinforcement fibres are pre-impregnated with a pre-catalysed resin. The resin is typically solid or near-solid at room temperature. The prepregs are arranged by hand or machine onto a mould surface, vacuum bagged and then heated to a temperature, where the resin is allowed to reflow and eventually cured. This method has the main advantage that the resin content in the fibre material is accurately set beforehand. The prepregs are easy and clean to work with and make automation and labour saving feasible. The disadvantage with prepregs is that the material cost is higher than for non-impregnated fibres. Further, the core material need to be made of a material, which is able to withstand the process temperatures needed for bringing the resin to reflow. Prepreg moulding may be used both in connection with a RTM and a VARTM process.

The present disclosure relates to a wind turbine comprising at least one wind turbine blade according to one or more aspects of this disclosure.

Figure 1:
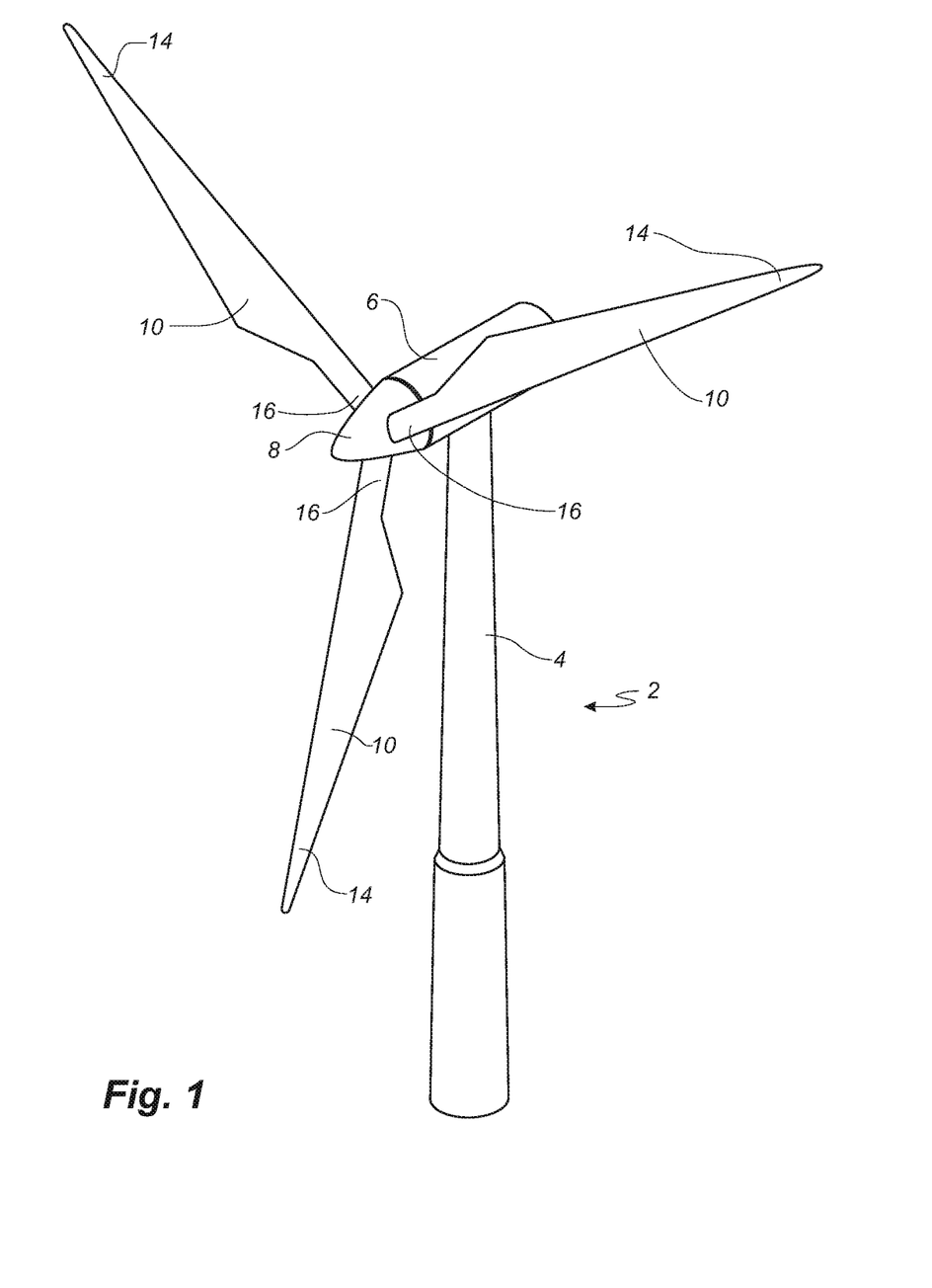
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
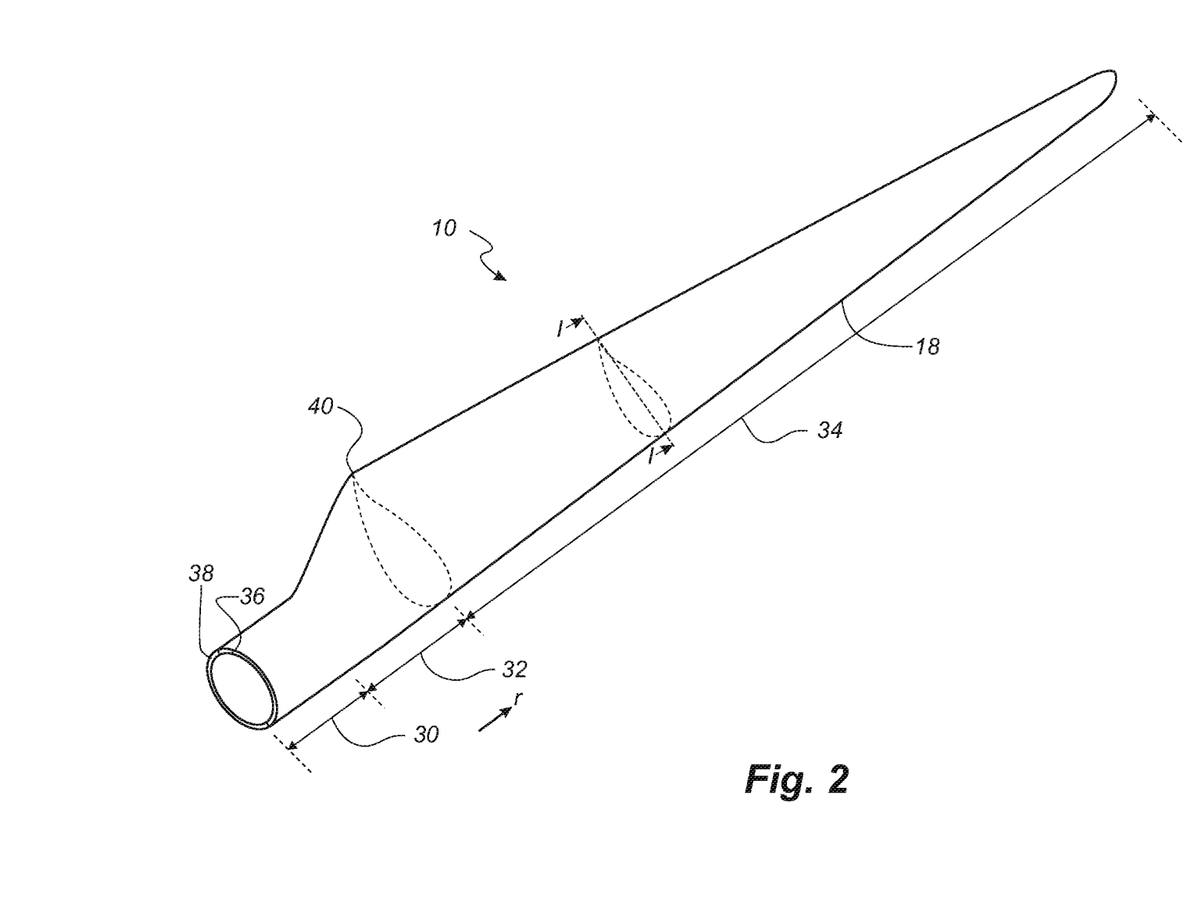
FIG. 2 shows a schematic view of a wind turbine blade according to the disclosure.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

The load-carrying structure preferably extends substantially in a longitudinal direction of the wind turbine blade 20 in direction between a root region 30 and a tip end of the airfoil region 18 of the blade 20.

Figure 3A:
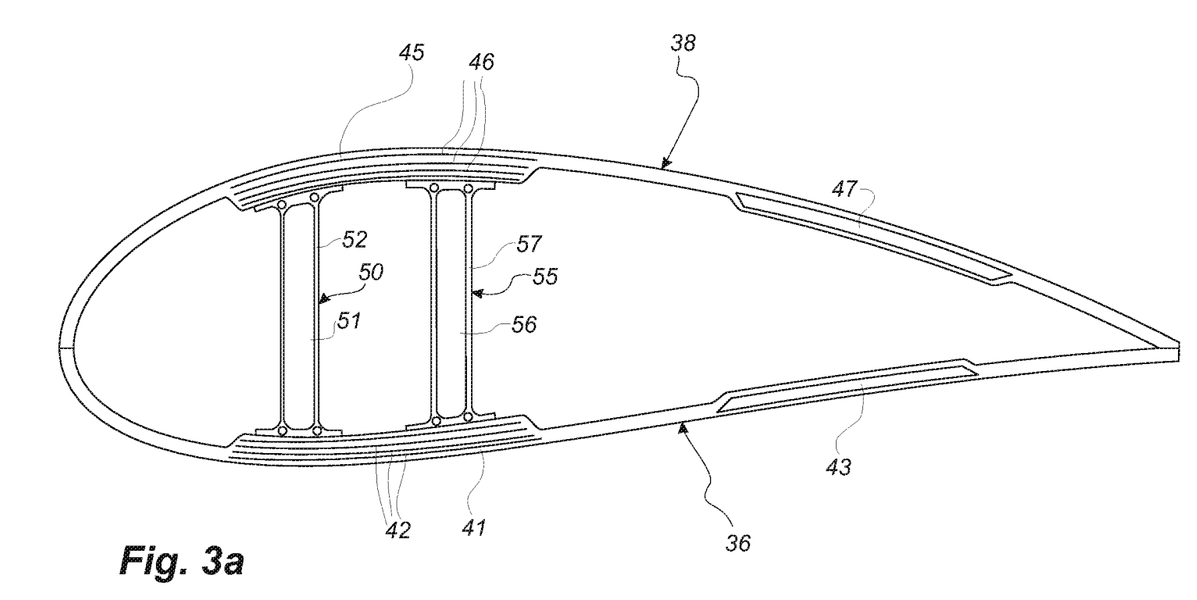
FIG. 3a shows a transverse cross section through a mould in a part of the airfoil region of an exemplary finished blade according to this disclosure.

FIG. 3*a* shows a transverse cross section of a wind turbine blade along the line I-I shown in FIG. 2. As previously mentioned, the blade 10 comprises a pressure side shell part 36 and a suction side shell part 38. The pressure side shell part 36 comprises a load carrying structure 41 such as spar cap or a main laminate, which constitutes a load bearing part of the pressure side shell part 36. The load carrying structure 41 comprises a plurality of fibre-reinforcement layers or fibre mats 42, such as unidirectional fibres aligned along the longitudinal direction of the blade in order to provide stiffness to the blade. The suction side shell part 38 also comprises a load carrying structure 45 comprising a plurality of fibre-reinforcement layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The load carrying structure 41 of the pressure side shell part 36 and the load carrying structure 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The second shear web 55 has a similar design with a shear web body and two web foot flanges, the shear web body comprising a sandwich core material 56 covered by a number of skin layers 57 made of a number of fibre layers.

The blade shells 36, 38 may comprise further fibre-reinforcement at the leading edge and the trailing edge. Typically, the shell parts 36, 38 are bonded to each other via glue flanges in which additional filler ropes may be used (not shown). Additionally, very long blades may comprise sectional parts with additional spar caps, which are connected via one or more additional shear webs.

Figure 3B:
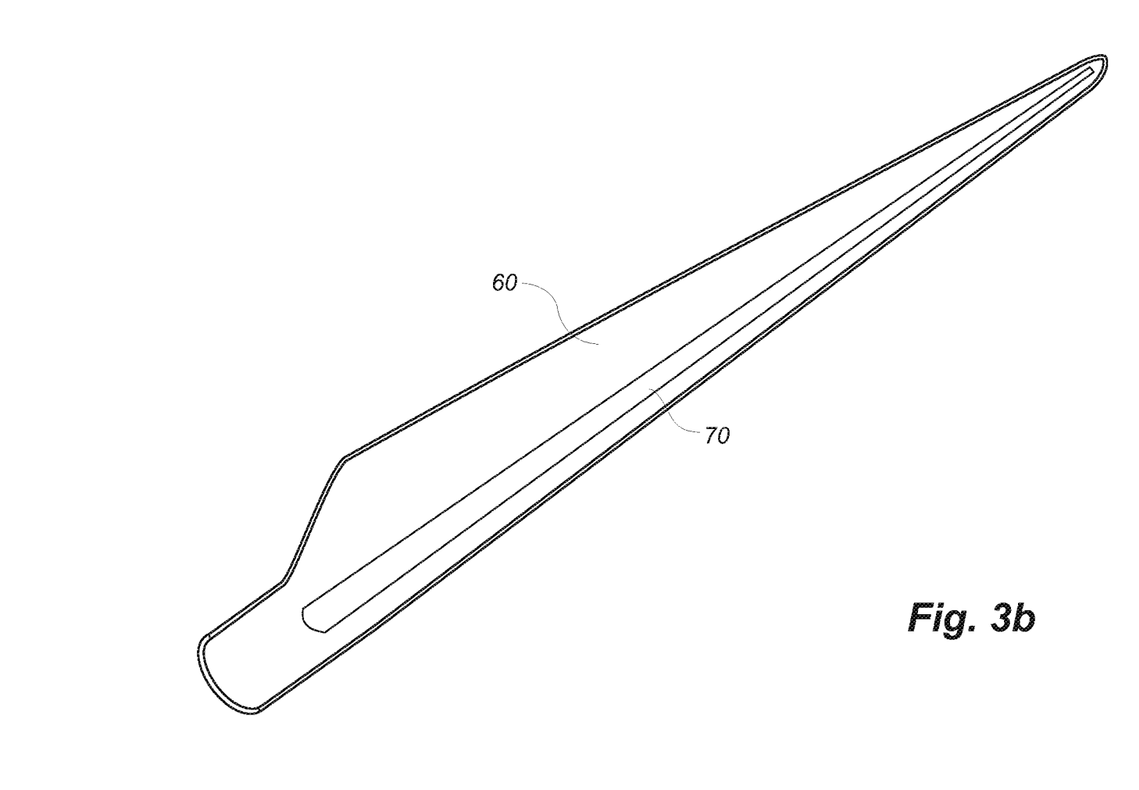
FIG. 3b shows a perspective view of a part of the wind turbine blade comprising the load carrying structure along the length of the blade according to this disclosure.

FIG. 3*b* shows a perspective view of a blade shell part, which comprises a blade shell part 60 and an integrated load carrying structure 70, which forms a spar cap or main laminate of the blade shell part.

Figure 4A:
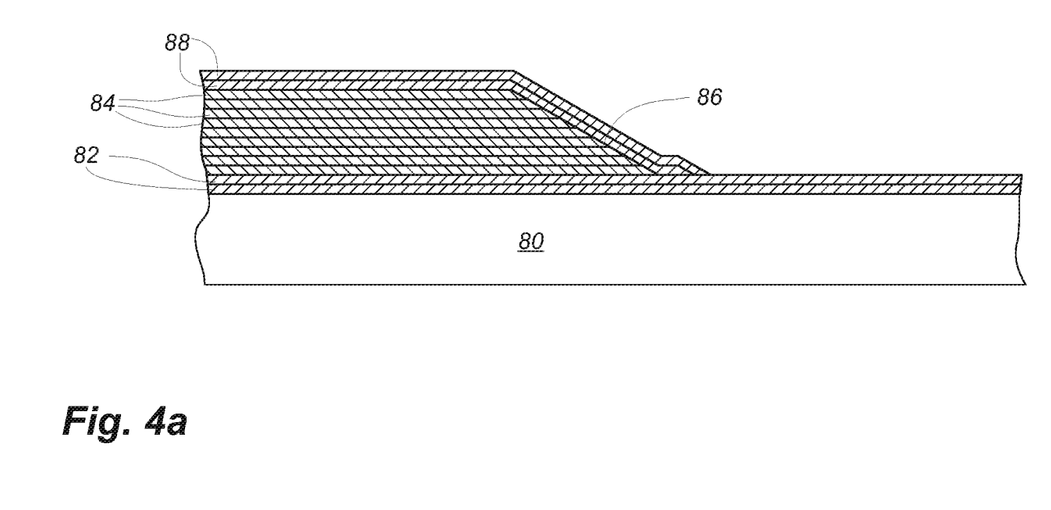
FIG. 4a shows the layup of fibre layers or fibre mats forming the load carrying structure according to the disclosure.

FIG. 4*a* illustrates the layup process involved in manufacturing a load carrying structure of a wind turbine blade and shows a part of a longitudinal cross-section of a blade mould 80.

The process involves the steps of laying up a primary fibre material in a mould 80. The primary fibre material comprises a number of outer skin layers 82, which form an outer part of the blade shell part. The outer skin layers 82 may for instance be made of biaxially oriented glass fibres. A plurality of fibre layers 84, preferably made of hybrid material (i.e. glass and carbon hybrid) are stacked on top of the outer skin layers 82. The fibre layers 84 have a pre-defined carbon fibre ratio defined as a volume of the carbon fibres divided by a total volume of the glass fibres and carbon fibres. The carbon fibre ratio is customized according to the placement of the layer in the load carrying structure (at a given distance from the root, or the tip). Each fibre layer or fibre mat may be manufactured for its specific region in load carrying structure of the blade (e.g. Start/stop position, root region, tip region, leading edge etc. . . . ) where a specific stiffness/compression is needed. The fibre layers or fibre mats 84 are preferably made of unidirectionally arranged hybrid fibres extending substantially in the longitudinal direction of the blade shell part in order to provide stiffness in the span wise direction of the finished blade. Each fibre layer or fibre mat has a defined (e.g. tailor-made, dedicated or predetermined) carbon fibre ratio. At least a number of the fibre layers or fibre mats 84 comprises glass fibre rovings arranged on a carbon fibre substrate, where at least a number of said stacked fibre layers or fibre mats 84 having different carbon fibre ratios is obtained by said fibre layers or fibre mats having different thicknesses of the carbon fibre substrate. The carbon fibre ratio of each of the stacked fibre layers 84 lies in a range between 5% to 80%.

The fibre layers or fibre mats 84 are added or stitched together adding carbon gradually through the entire length of the blade. The outermost layers of the stacked fibre layers or fibre mats 84 have a higher carbon fibre ratio than innermost layers of stacked fibre layers or fibre mats 84. This provides a simple way of increasing the overall carbon fibre ratio towards the tip end of the blade. This could be performed with a gradual transition through the thickness of the load carrying structure.

Figure 4B:
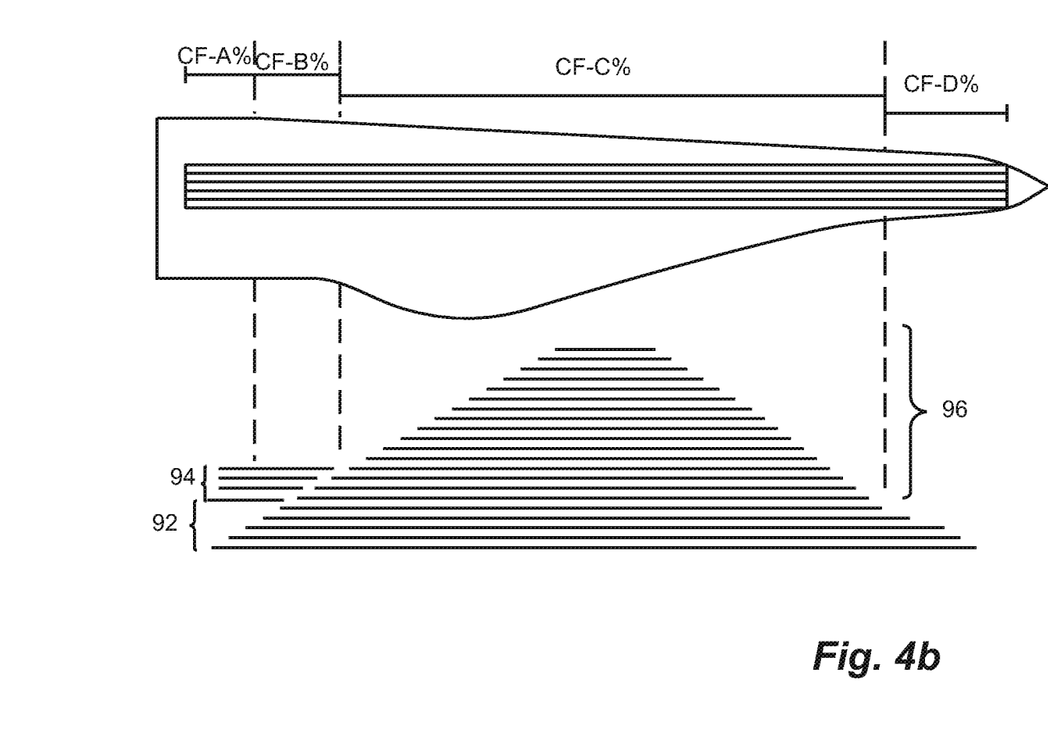
FIG. 4b shows a schematic view of a wind turbine blade comprising the load carrying structure where the carbon fibre ratio of fibre material varies through the thickness of the load carrying structure according to this disclosure.

Stacking the fibre layers or fibre mats 84 with layers or fibre mats having different carbon fibre ratios as shown in FIG. 4b may provide a smooth transition from pure glass to full carbon (or from a first carbon fibre ratio to a second carbon fibre ratio), and a carbon fibre ratio of fibre material that varies through the thickness of the load carrying structure.

The load carrying structure could be built entirely or partly from such fibre layers or fibre mats with various carbon fibre ratio or various stiffness. The overall carbon fibre ratio of the load carrying structure varies gradually in the longitudinal direction of the blade. An overall carbon fibre ratio through the length of the load carrying structure from the root to the tip of the wind turbine blade varies between 0% to 20% at the root to 50% to 70% at the tip.

In one or more preferred embodiments, it is beneficial to create the outermost fibre layers such that the outermost fibre layers have a first carbon fibre ratio and the innermost fibre layers so the innermost fibre layers have a second carbon fibre contents. Additional glass fibre layers or fibre mats may be added in the root region. Hybrid material having a third carbon fibre ratio may be arranged in other regions.

This provides the advantage and possibility of optimizing the safety/stiffness through the length of the blade. This results in reducing overall mass and mass moment while optimizing stiffness in the tip end of the blade. The overall carbon fibre ratio is gradually increasing along the load-carrying structure towards a tip end of the blade.

The end sections of the plurality of fibre layers or fibre mats may be preferably tapered and arranged so as to form a taper section 86. While FIG. 4a depicts a very steep taper section, it is recognised that the taper section may extend along several metres of the load-carrying structure.

A number of inner skin layers 88 are arranged on top of the fibre layers or fibre mats. The inner skin layers may also be made of biaxially oriented glass fibres. The inner skin layers 88 may be laid over the ends of the fibre layers or fibre mats 84 so that the inner skin layers make up part of the taper section 86, as shown in FIG. 4a.

Subsequently a number of resin inlets (not shown) and vacuum outlets (not shown) are arranged on top of the primary fibre material, and finally a vacuum bag (not shown) is arranged on top. Then the primary fibre material is infused with a primary resin, advantageously a polyester resin, via a VARTM process, and the resin is cured in order to form a cured blade element. In the shown embodiment, the outer skin layers 86 form part of the aerodynamic shell of the finished wind turbine blade, whereas the fibre layers or fibre mats 84 form part of a root laminate of the wind turbine blade.

FIG. 4b shows a schematic top view of a blade shell part illustrating the load carrying structure with the varying carbon fibre ratio along the length of the blade shell part according to this disclosure. FIG. 4b further shows, in the lower part, a schematic side view of an exemplary stacking of the fibre layers or fibre mats where at least some fibre layers or fibre mats have a different carbon fibre ratio than other fibre layers or fibre mats. For example, outermost fibre layers or fibre mats 92 (e.g. 3-4) are made with a carbon fibre ratio of around 60-80% and extend from the root region of the blade to the tip region of the blade. In other words, the outermost fibre layers or fibre mats are as long as the length of the load carrying structure. The next fibre layers or fibre mats 96, which are arranged innermost are made with a carbon fibre ratio of around 30-40% and extends from the root region of the blade to the tip region of the blade but are shifted with respect to the outermost layers or fibre mats 92 to achieve a certain carbon fibre ratio (such as around 30-35% carbon fibre ratio) that evolves smoothly in the longitudinal direction, e.g. from mainly glass to mainly carbon (or at least two different carbon fibre ratios CF-A % and CF-D %). Each fibre layer among the fibre layer or fibre mats 96 are shifted with respect to each other, the upper fibre layer or fibre mat being shorter that the lower fibre layer or fibre mat. This shows how the outermost layers of said stacked fibre layers or fibre mats have a higher carbon fibre ratio than innermost layers of said stacked fibre layers or fibre mats. Additional glass fibre mats 94 are placed on top of the first fibre layers or fibre mats 92 at the root region so as to achieve a lower carbon fibre ratio CF-A (such as about 5-10% carbon fibre ratio) at the root region, a transitional carbon fibre ratio CF-B (such as about 11-15% carbon fibre ratio) in the transition region, an intermediate carbon fibre ratio CF-C in the airfoil region while the first fibre layers or fibre mats 92 are left uncovered at the tip region to provide a high carbon fibre ratio CF-D (such as about 60-80% carbon fibre ratio) at the tip region. The thickness of the load carrying structure may be tapered in the longitudinal direction towards a tip end of the blade by reducing the number of stacked fibre layers or fibre mats towards the tip end of the blade. This may be carried out by the end faces of juxtaposed stacked layers or fibre mats being shifted relative to each other in the longitudinal direction.

Figure 5:
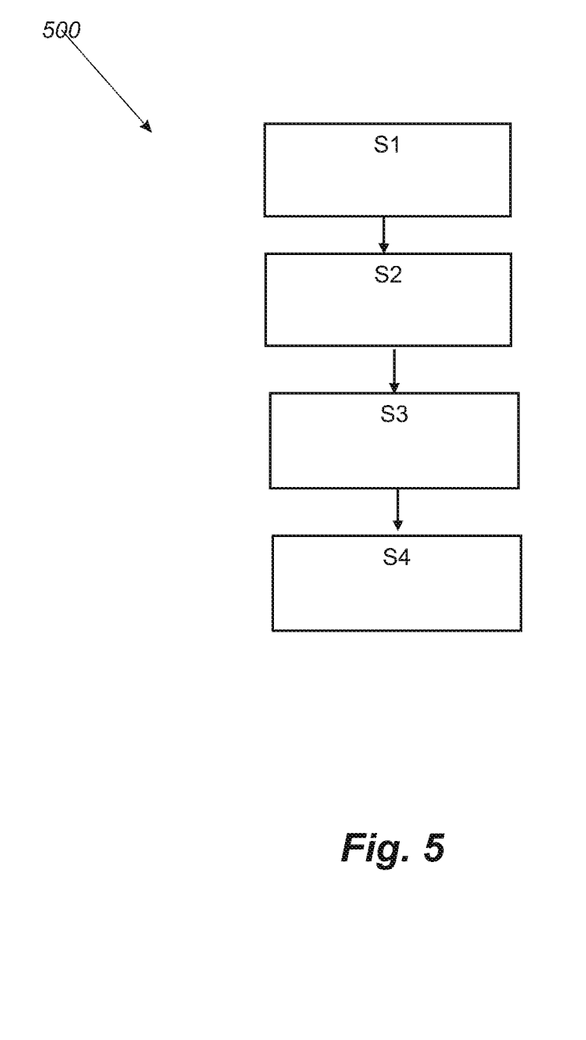
FIG. 5 shows a flow-chart illustrating a method of manufacturing at least a part of a wind turbine blade according to this disclosure.

FIG. 5 is a flow-chart illustrating an exemplary method 500 of manufacturing at least a part of a wind turbine blade comprising a load carrying structure. The method 500 comprises providing S1 a plurality of stacked fibre layers or fibre mats comprising both carbon fibres and glass fibres. For example, the method comprises providing S1 a plurality of stacked fibre layers or fibre mats. The fibre layers or fibre mats comprise carbon fibre and/or glass fibre with various carbon fibre ratios.

The method comprises arranging S2 the plurality of the stacked fibre layers or fibre mats in a mould so as to obtain a varying carbon fibre ratio through the thickness of the load carrying structure. The carbon fibre ratio is configured to vary through the thickness so as to achieve an optimal stiffness. Arranging S2 comprising laying or stacking a plurality of fibres or fibre mats so that the fibre layers or fibre mats at least partially overlap, so as to form the thickness of the load carrying structure. In one or more embodiments, arranging the plurality of the stacked fibre layers or fibre mats in a mould comprises arranging the plurality of individual hybrid material layers. The arranging step S2 can be performed by positioning a plurality of hybrid material layers such that a plurality of the fibre layers at least partially overlaps in a stack. An example of arranging the plurality of stacked fibre layers is given in FIG. 3b. For example, arranging S2 comprising laying first as the outermost layer the longest fibre layer or ply with the highest carbon fibre ratio, following with a shorter fibre layer, and an even shorter fibre layer, etc. This provides a blade comprising a tip made with an increased carbon fibre ratio, simply by placing a number of plies (e.g. one to six) with a high carbon fibre ratio outermost. This is made possible as compression straining is not as high in the tip sections as the high straining areas around the shoulder. The load carrying structure at the shoulder has a dominantly low carbon fibre ratio (such as 30-35%) as only a few (e.g. one to six) fibre layers of high carbon fibre ratio form the primary tip end of the load carrying structure. The carbon fibre ratio at the shoulder may be around 20-50%.

The method 500 comprises infusing S3 the plurality of stacked fibre layers with a resin; and curing S4 the resin to form at least part of a wind turbine blade. Infusing S3 may comprise vacuum infusion or VARTM (vacuum assisted resin transfer moulding), and/or pre-preg techniques, as described above.

The method 500 provides a continuous ply or fibre layer layout with reduced drops, and misalignments between the fibre layers.

The invention has been described with reference to a preferred embodiment. However, the scope of the invention is not limited to the illustrated embodiment, and alterations and modifications can be carried out without deviating from the scope of the invention.

The invention claimed is:

1. A wind turbine blade comprising a load carrying structure made of a fibre-reinforced polymer material, wherein the load carrying structure comprises a plurality of stacked fibre mats in a thickness of the load carrying structure,
   wherein a plurality of said stacked fibre mats are made of hybrid material comprising both carbon fibres and glass fibres and having a carbon fibre ratio, which is defined as a volume of the carbon fibres divided by a total volume of the glass fibres and carbon fibres, wherein
      at least a number of said stacked fibre mats have different carbon fibre ratios such that the carbon fibre ratio of fibre material varies through the thickness of the load carrying structure.

2. The wind turbine blade according to claim 1, wherein the stacked fibre mats comprise in a cross section a number of first fibre mats having a first carbon fibre ratio and a number of second fibre mats comprising a second carbon fibre ratio.

3. The wind turbine blade according to claim 2, wherein the first carbon fibre ratio and the second carbon fibre ratio differs with at least 10%.

4. The wind turbine blade according to claim 1, wherein at least a number of the stacked fibre mats comprises glass fibre rovings arranged on a carbon fibre substrate.

5. The wind turbine blade according to claim 4, wherein at least a number of said stack fibre mats having different carbon fibre ratios is obtained by said fibre mats having different thicknesses of carbon fibre substrate.

6. The wind turbine blade according to claim 1, wherein the load carrying structure is a spar cap.

7. The wind turbine blade according to claim 6, wherein the spar cap is integrated in a blade shell of the wind turbine blade.

8. The wind turbine blade according to claim 1, wherein the carbon fibre ratio of the stacked fibre mats lies in an interval between 5% to 80%.

9. The wind turbine blade according to claim 1, wherein an overall carbon fibre ratio through the length of the load carrying structure from the root to the tip of the wind turbine blade varies between 0% to 20% at the root to 50% to 70% at the tip.

10. The wind turbine blade according to claim 9, wherein outermost layers of said stacked fibre layers have a higher carbon fibre ratio than innermost layers of said stacked fibre mats.

11. The wind turbine blade according to claim 9, wherein the overall carbon fibre ratio through the length of the load carrying structure from the root to the tip of the wind turbine blade varies with a gradual transition in a longitudinal direction between the root and the tip.

12. The wind turbine blade according to claim 1, wherein the thickness of the load carrying structure is tapered in the longitudinal direction towards a tip end of the blade by reducing the number of stacked fibre mats towards the tip end of the blade.

13. A wind turbine comprising at least one wind turbine blade according to claim 1.

14. A method of manufacturing at least a part of a wind turbine blade comprising a load carrying structure, the method comprising:
   stacking a plurality of fibre mats comprising both carbon fibres and glass fibres, having a carbon fibre,
   arranging the plurality of said stacked fibre mats in a mould so as to obtain a varying carbon fibre ratio through the thickness of the load carrying structure;
   infusing said plurality of stacked fibre mats with a resin; and
   curing said resin to form at least part of a wind turbine blade.

15. The method according to claim 14, wherein the hybrid material mat is provided as a dry fibre mat.

* * * * *